US008978483B2

(12) United States Patent
Pagani et al.

(10) Patent No.: US 8,978,483 B2
(45) Date of Patent: Mar. 17, 2015

(54) INTEGRATED ELECTRONIC DEVICE FOR DETECTING A LOCAL PARAMETER RELATED TO A FORCE EXPERIENCED IN A PREDETERMINED DIRECTION, WITHIN A SOLID STRUCTURE

(71) Applicant: STMicroeletronics S.R.L., Agrate Brianza (IT)

(72) Inventors: Alberto Pagani, Nova Milanese (IT); Federico Giovanni Ziglioli, Pozzo d'adda (IT); Bruno Murari, Monza (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 0 days.

(21) Appl. No.: 14/108,688

(22) Filed: Dec. 17, 2013

(65) Prior Publication Data
US 2014/0182394 A1    Jul. 3, 2014

(30) Foreign Application Priority Data

Dec. 27, 2012    (IT) .............................. MI2012A2240

(51) Int. Cl.
*G01L 1/22*       (2006.01)
*G01L 1/18*       (2006.01)
*G01M 5/00*       (2006.01)
(Continued)

(52) U.S. Cl.
CPC ............... *G01L 1/18* (2013.01); *G01M 5/0041* (2013.01); *G01M 5/0083* (2013.01); *G01L 1/26* (2013.01); *G01B 7/18* (2013.01)
USPC ........................................ 73/862.045; 73/862

(58) Field of Classification Search
USPC ....................................................... 73/862.45
See application file for complete search history.

(56) References Cited

U.S. PATENT DOCUMENTS 6,082,200 A * 7/2000 Aslam et al. ..................... 73/774
6,300,223 B1 * 10/2001 Chang et al. .................. 438/460
6,300,233 B1 * 10/2001 Lee et al. ...................... 438/601
(Continued)

FOREIGN PATENT DOCUMENTS

EP        0735352 A2     2/1996
WO    2012084295 A1     6/2012

OTHER PUBLICATIONS

Kuo et al., "Smart-Cur™ Piezoresistive Strain Sensors for High Temperature Applications," IEEE Sensors 2009 Conference, 2009, pp. 1290-1292.

*Primary Examiner* — Harshad R Patel
*Assistant Examiner* — Jamel Williams
(74) *Attorney, Agent, or Firm* — Allen, Dyer, Doppelt, Milbrath & Gilchrist, P.A.

(57) ABSTRACT

The integrated electronic device is for detecting a local parameter related to a force experienced in a predetermined direction within a solid structure. The device includes a semiconductor substrate having a substantially planar region that defines a plane substantially perpendicular to the predetermined direction. At least one sensor detects the local parameter at least in the predetermined direction with a piezoresistive effect. At least one substantially planar face is arranged in a portion of the integrated electronic device, the face belonging to a inclined plane by a predetermined angle relative to the plane perpendicular to the predetermined direction, which plane is defined by the substantially planar region of the substrate. The predetermined angle is defined such as to reduce forces acting in directions other than the predetermined direction at the portion of the device around the at least one sensor.

26 Claims, 10 Drawing Sheets

(51) Int. Cl.
*G01L 1/26* (2006.01)
*G01B 7/16* (2006.01)

(56) References Cited

U.S. PATENT DOCUMENTS

| | | | |
|---|---|---|---|
| 6,492,716 B1 * | 12/2002 | Bothra et al. | 257/678 |
| 6,709,954 B1 * | 3/2004 | Werking | 438/460 |
| 6,722,212 B2 * | 4/2004 | Specht | 73/862.381 |
| 6,732,592 B1 * | 5/2004 | Blackburn et al. | 73/826 |
| 6,753,608 B2 * | 6/2004 | Tomita | 257/758 |
| 6,787,054 B2 * | 9/2004 | Wang et al. | 216/72 |
| 6,841,455 B2 * | 1/2005 | West et al. | 438/462 |
| 6,950,767 B2 | 9/2005 | Yamashita et al. | |
| 6,960,496 B2 * | 11/2005 | Chen et al. | 438/140 |
| 7,224,042 B1 * | 5/2007 | McCollum | 257/620 |
| 7,242,286 B2 * | 7/2007 | Knox | 340/457.1 |
| 7,357,419 B2 * | 4/2008 | Kock et al. | 280/801.1 |
| 7,752,925 B2 * | 7/2010 | Koors et al. | 73/862.391 |
| 7,806,007 B2 * | 10/2010 | Murphy et al. | 73/862.391 |
| 2011/0239783 A1 * | 10/2011 | Kurtz et al. | 73/862.041 |
| 2014/0182390 A1 | 7/2014 | Pagani et al. | |
| 2014/0264657 A1 * | 9/2014 | Gogoi | 257/416 |

* cited by examiner

INTEGRATED ELECTRONIC DEVICE FOR DETECTING A LOCAL PARAMETER RELATED TO A FORCE EXPERIENCED IN A PREDETERMINED DIRECTION, WITHIN A SOLID STRUCTURE

FIELD OF INVENTION

The present invention generally relates to integrated electronic devices for monitoring parameters within a solid structure, and particularly to an integrated electronic device for detecting a local parameter related to a force experienced in a predetermined direction, within a solid structure.

BACKGROUND OF THE INVENTION

In solid structures, in particular in load-bearing structures of, for example, bridges, buildings, galleries, railways, retaining walls, dams, dykes, slabs and beams of buildings, underground piping and structures of urban subways, and the like, it may be important to monitor, in several points, significant parameters, particularly mechanical stresses (and thus those forces and/or pressures causing the latter) to which the structure is subjected in those locations. In the present description, solid structures are considered such as structures made from construction material, for example cement, concrete, mortar, and the like.

Such monitoring, which is carried out either periodically or continuously, can be useful both in the step of initial construction and during the life of a solid structure.

To this purpose, electronic monitoring devices are known which use sensors being capable of offering a good performance while being cost-effective. Usually, these electronic devices are directly applied to the outer surface of the solid structure to be monitored, or within recesses that are previously provided therein and that are accessible from the outside.

To enhance the monitoring, in view of achieving a reliable evaluation of the solid structure, in terms of safety, aging, reaction to varying atmospheric conditions, and the like, approaches have been also developed wherein monitoring electronic devices are completely embedded, i.e. "buried" into the material (for example reinforced concrete) of which the solid structure to be monitored is made.

U.S. Pat. No. 6,950,767 describes an electronic monitoring device such as a system packaged in one container, which includes several parts that are assembled on a substrate, such as integrated circuits, sensors, antennas, capacitors, batteries, memories, control units and the like, which are implemented in various "chips" that are connected to each other. The approach described in U.S. Pat. No. 6,950,767 is a so-called approach of the "System in Package" type (SiP). It should be understood, however, that a SiP, which is intended to be first "drowned" in a construction material (e.g. liquid concrete, which is then intended to cure) and then remain "buried" within the solid structure, is subjected to critical conditions, for example due to the very high pressures thereon, which can even be as high as several hundreds of atmospheres. In addition, a number of other causes of wear exist, over time, for example, due to water infiltrations, which are capable of damaging the system. Accordingly, in the above-mentioned field of application, the approach described in U.S. Pat. No. 6,950,767 may not be fully satisfactory in terms of reliability.

Other prior art approaches use the piezo-resistive effect, i.e. the dependence between an electric signal generated by a piezo-resistive sensor and a mechanical stress (that is, strain, i.e., compression or tension) experienced by the material (for example, silicon) which the sensor has been manufactured from. The mechanical stress can be, in turn, representative of a pressure and/or force to which the sensor is subjected. The ratio between the force applied and the electric signal generated (sensitivity) depends on the reaction of the material (silicon) to the stresses, which, in turn, depends on the crystal orientation of the silicon. The sensitivity is thus a function of the direction in which the force, and the consequent mechanical stress, are applied.

The overall intensity as measured by the above-mentioned prior art devices comprises a contribution deriving from the vertical component of the force, but also a contribution deriving from the horizontal (or "lateral", in an equivalent definition) component of the force. If it is desired to detect the vertical component of the force, and in case this component (weight force) is much greater than the lateral component, despite the intensity as detected by the sensors of the prior art devices is a good approximation of the result that is desired to be achieved, the above-mentioned prior art devices may have several drawbacks.

First of all, as stated above, the result of the sensor measurement does not correspond only to the vertical component. Furthermore, the result of the sensor measurement may not correspond even to the actual intensity of the force, as the two vertical and transversal components may result as being weighed differently by different sensitivity values. In addition, it is not possible to differentiate between the two components, nor measure them separately.

Furthermore, in case the lateral force is desired to be measured, this cannot be done simply by orientating the sensor so as to align the direction of maximum sensitivity with one of the crystalline axes. In fact, in this case, the result would be also influenced by the component along the crystalline axis that is aligned with the vertical, and thus is affected by the weight of the structure, which totally impairs the correctness and accuracy of the result.

Furthermore, generally, it should be understood that the building structures to be monitored can be anisotropic systems, wherein each point can be subjected to forces/stresses in different directions, i.e., having at least two components which are desired to be measured separately. Accordingly, with such a type of solid structure, the lateral mechanical flexural, compression or tension stresses being present in those points to be monitored, which are for example due to winds or particular structural configurations, also need to be known to obtain the most accurate monitoring for an effective maintenance of the structure.

From the above, it may be desired to improve the accuracy and correctness of detection, and particularly to allow individual detections of both the lateral and vertical components of the mechanical stress, or in other words, to detect the component of the force applied to a point in a specific (either vertical or lateral) direction of interest.

SUMMARY OF THE INVENTION

An object of the present invention is to provide an improved integrated electronic device for detecting a local parameter related to an experience in a predetermined direction, within a solid structure, which allows to at least partially overcome the drawbacks described above with reference to the prior art.

This object is achieved with an integrated electronic device for detecting a local parameter related to a force experienced in a predetermined direction within a solid structure. The device includes a substrate made of semiconductor material having a substantially planar region that is suitable to define a plane substantially perpendicular to the predetermined direction. At least one sensor is configured to detect the local parameter at least in the predetermined direction with a piezoresistive effect. The sensor being arranged at the substantially planar region of the substrate. At least one substantially planar face being arranged in a portion of the integrated electronic device around the at least one sensor, the face belonging to a inclined plane by a predetermined angle relative to the plane perpendicular to the predetermined direction, which plane is defined by the substantially planar region of the substrate. The predetermined angle is defined such as to reduce forces acting in directions other than the predetermined direction at the portion of the device around the at least one sensor.

A detection and monitoring module, comprising the integrated electronic device, and a monitoring system comprising the detection and monitoring module, are also objects of the present invention.

BRIEF DESCRIPTION OF THE PREFERRED EMBODIMENTS

Further characteristics and advantages of the integrated electronic detecting device, according to the invention, will be better understood from the description below of preferred exemplary embodiments, which are given by way of non-limiting illustration, with reference to the annexed figures, in which:

FIGS. 1A and 1B are sensitivity diagrams (i.e., piezoresistive coefficients) of a sensor of an integrated electronic device according to an embodiment of the invention;

FIGS. 2, 3, and 4 are cross-sectional views of an integrated electronic device according to an embodiment of the invention;

FIGS. 5, 6, 7, 8, and 9 are cross-sectional views of an integrated electronic device according to further embodiments of the invention;

DETAILED DESCRIPTION OF THE PREFERRED EMBODIMENTS

With reference to the above figures, an integrated electronic device is now described for detecting a local parameter related to a force experienced in a predetermined direction, within a solid structure, according to the present invention. The integrated electronic device, designated for simplicity as the "device" herein below, is designated in the figures, as a whole, with the numeral 1. It should be understood that like or similar elements will be designated with the same numerals or letters in the figures.

Figure 1A:
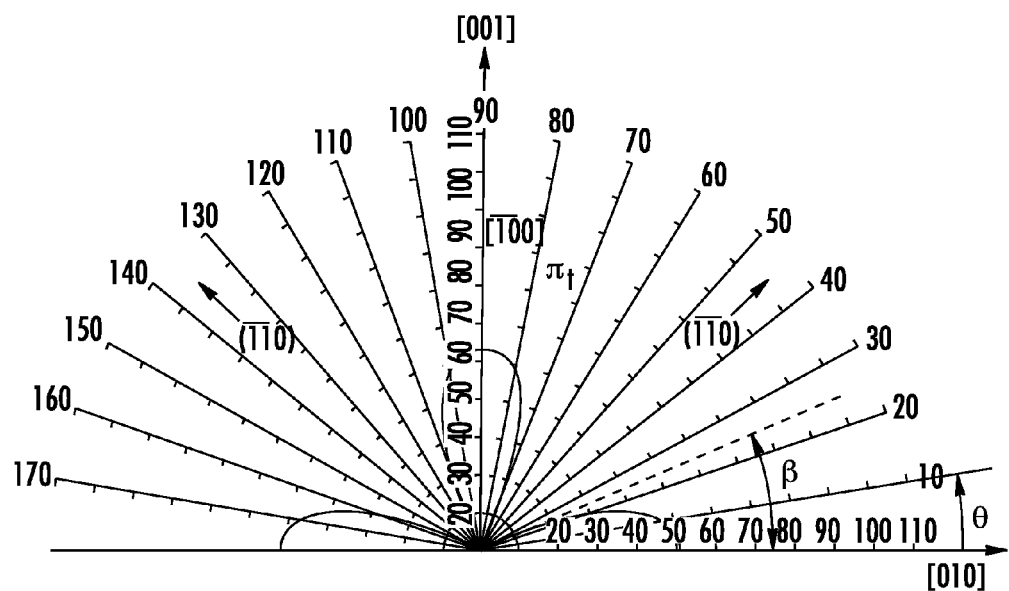
Figure 1B:
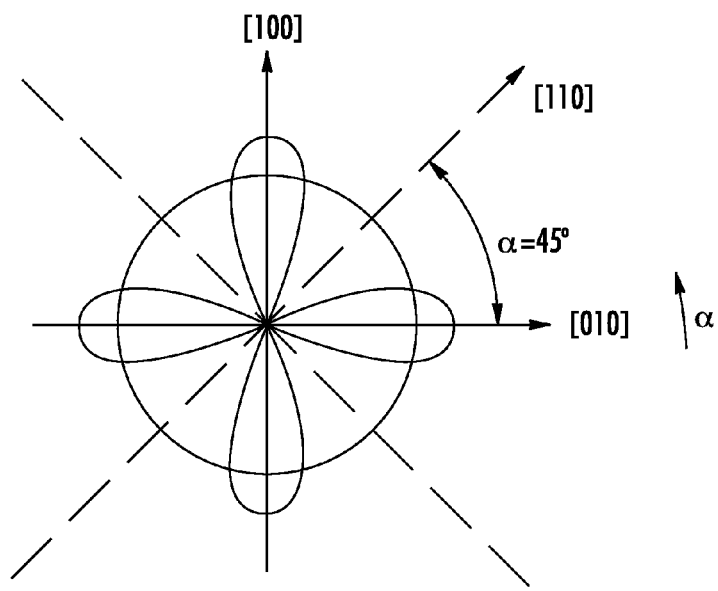

With particular reference to FIGS. 1A and 1B, several principles of the piezo-resistive effect, which the force/pressure sensors used in the device 1 are based on, will be recalled herein. A pressure sensor of the type described herein is capable of converting a pressure value to an electric variable, for example using the known variations that the mechanical stress induced by the pressure on the semiconductor (for example, silicon) causes for example to the mobility of electrons/holes in the same semiconductor.

It is known that the mobility depends on the pressure in a manner dependent on the crystal orientation of the semiconductor material, according to rules of the piezo-resistivity phenomenon. Particularly, with reference to Miller indices, an N-type crystal should be considered (the same is true for a P-type crystal) in the plane [100]-[010], defined by the crystalline axes [100] and [010]. In such an example, illustrated in FIG. 1B, the sensitivity to the mechanical stress, thus to the pressure, is maximum if this stress is applied along the axes [100] and [010] relative to a reference system associated with the crystal orientation, while it is minimum along the axes [110]. The angular trend for each angle $\phi$ is shown in FIG. 1B.

To detect the pressure and/or force acting in a certain predetermined direction, the sensor should be positioned so that the predetermined direction coincides with the axis of maximum sensitivity (or with one of the axes of maximum sensitivity). For the sake of descriptive clarity, it will be assumed that this axis is always [001], but it should be understood that the description can be easily generalized in case of conventionally different notations.

Regarding the reference system x-y-z relative to which the direction of detection is defined, to the purposes of the present disclosure, the vertical axis (the one on which the force of gravity acts) will be referred as "z" and the axes orthogonal to "z" will be referred as "x" and "y", thus defining a horizontal plane. Accordingly, a force acting on a point of a solid structure can be split in two components, a vertical component Fz and a horizontal component Fxy.

FIG. 1A shows the sensitivity lobes on the plane perpendicular to the one considered in FIG. 1B, i.e., relative to the crystalline axes, on the plane containing the axes [100] and [010]. The diagram of FIG. 1A thus illustrates the effect of the vertical component Fz of the force, depending on the angle $\theta$ formed by the direction of application of such a force relative to the axis [010], on the plane [010]-[100].

Similarly, the diagram of FIG. 1B illustrates the effect of the horizontal component Fxy of the force, depending on the angle $\phi$ formed by the direction of application of such a force relative to the axis [010], on the plane [010]-[001]. It should be noted that minimum sensitivity directions with $\phi=45°$ are illustrated in FIG. 1B with a broken line.

As a whole, FIGS. 1A and 1B illustrate the "tridimensional" dependence of the sensitivity on the mechanical stress, i.e., compression or tension, as experienced by the sensor, as a function of a force and/or pressure being applied in any direction. This dependence could be also figured as a tridimensional diagram, wherein the volumetric lobes are shown as rotation ellipsoids.

In other words, the piezo-resistive structures made from the semiconductor material of the chip, then integrated in the integrated device 1, according to the invention, are sensitive to the pressures, and therefore to the forces, which all the surfaces of the device are subjected to, both in terms of tension and compression. Assuming that these piezo-resistive structures, particularly the sensor, are made of silicon, it can be observed that the relationship between a generated electrical signal and applied stress is almost perfectly linear, both on the positive axis (compression) and on the negative axis (tension), even at very high stress values.

With reference now to FIGS. 2, 3, 4, and 5, the device 1 will be now described according to an embodiment of the present invention. As stated above, the device 1 is configured to detect a local parameter related to a force being experienced (for example F2) in a predetermined direction D1, within a solid structure (not shown in the figures). The predetermined direction D1 is also designated in the figures as the axis [001], as defined above.

To the purposes of the present invention, with "local parameter related to a force" is meant for example a force or a pressure, or a mechanical stress, of compression or tension, which is caused by such a force or such a pressure.

The device 1 comprises a substrate 2 of semiconductor material, for example silicon, having a substantially planar region 3 which is suitable to define a plane P1 substantially perpendicular to the predetermined direction D1. The device 1 further comprises at least one sensor 4 (illustrated from FIG. 5 onwards) which is configured to detect said local parameter at least in said predetermined direction D1 by means of a piezo-resistive effect.

The at least one sensor 4 is arranged at the substantially planar region 3 of the substrate 2. In the embodiment in FIG. 5, the at least one sensor 4 is arranged such as to be crossed by the plane P1 substantially perpendicular to the predetermined direction D1, which plane is defined by the substantially planar region 3. It should be understood that active elements, such as piezo-resistors, piezo-transistors, and piezo-MOS of the at least one sensor 4 are formed from the substantially planar region 3 of the substrate 2 using known microelectronic techniques.

The at least one sensor 4 is a sensor of force and/or pressure and/or mechanical stress, using the piezo-resistive effect, and behaves according to what has been described above, with reference to the FIGS. 1A and 1B. The at least one sensor 4 can be made, for example, by means of a silicon portion in crystalline form, having well-determined crystalline axes and a known orientation. Furthermore, the at least one sensor 4 can be made of electronic structures which are known per se, such as a Wheatstone bridge consisting of four resistances, wherein two pressure-sensitive resistances are oriented to the axes [100] and [010] associated with the crystalline orientation, whereas the other two are orientated along the axes [110], which orientation coincides with the angle of the minimum sensitivity axis of the piezo-resistive effect. The output signal of this structure is representative of the force and/or pressure being detected.

The device 1 further comprises at least one substantially planar face 5 which is arranged in a portion 6 of the integrated electronic device 1 around the at least one sensor 4. This at least one face 5 pertains to a plane P2 tilted by a predetermined angle α relative to the plane P1 perpendicular to said predetermined direction D1, which plane is defined by the substantially planar region 3 of the substrate 2. This at least one face 5 is arranged so as to be crossed by the plane P1 perpendicular to said predetermined direction D1, which plane is defined by the substantially planar region 3 of the substrate 2.

In accordance to further embodiments, not illustrated in the figures, the device 1 can further comprise at least one sealing element (for example, a seal ring) which is formed from the planar region 3 of the substrate 2 and interposed between the at least one sensor 4 (and optionally other electronic circuitry of the device 1) and the at least one face 5 such as to surround the at least one sensor 4 (and optionally other electronic circuitry of the device 1).

The predetermined angle γ is defined such as to reduce the effect of forces F1 acting in directions other than the predetermined direction D1 at the portion 6 of the device 1 around the at least one sensor 4.

It is pointed out that the definition of the above-mentioned at least one face 5, both in terms of position and in terms of tilting relative to the plane 21 as defined by the substantially planar region 3 of substrate 2, advantageously allows to reduce, in the portion of the device 1 around the at least one sensor 4, the lateral stress to which the at least one integrated sensor 4 (piezo-resistive structure) is subjected at the substantially planar region 3 of the substrate 2. In fact, this at least one face 5 is suitable to change the direction of application of the force F1 on the crystal, and the at least one face 5 has a mechanical function.

This advantageously allows to increase the sensitivity of a piezo-resistive structure substantially only to the forces (for example, F2) perpendicular to the substantially planar region 3, i.e. those parallel to the predetermined direction D1, along which the force F2 is experienced, the local parameter thereof being required to be detected.

Figure 2:
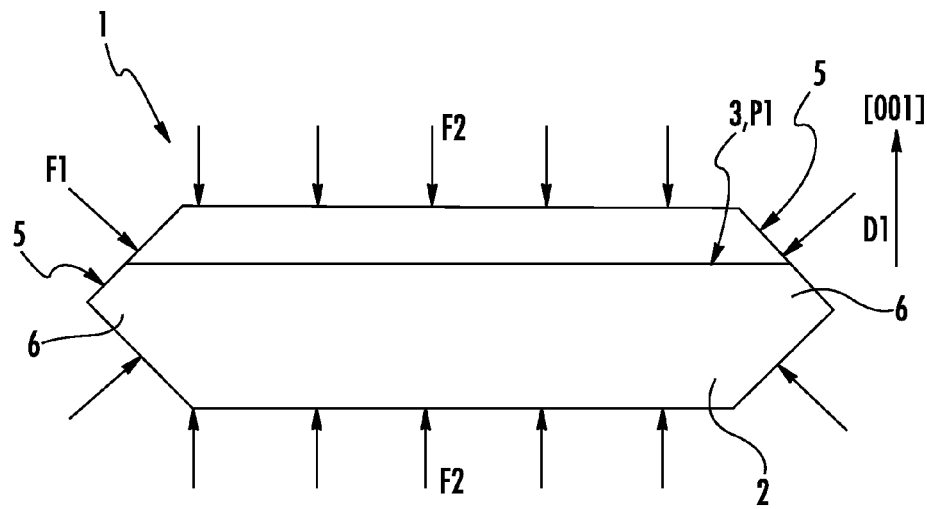
Figure 3:
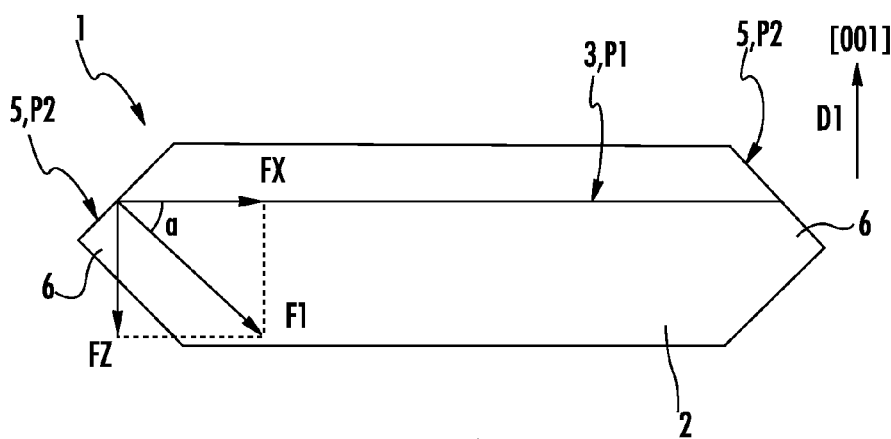
Figure 4:
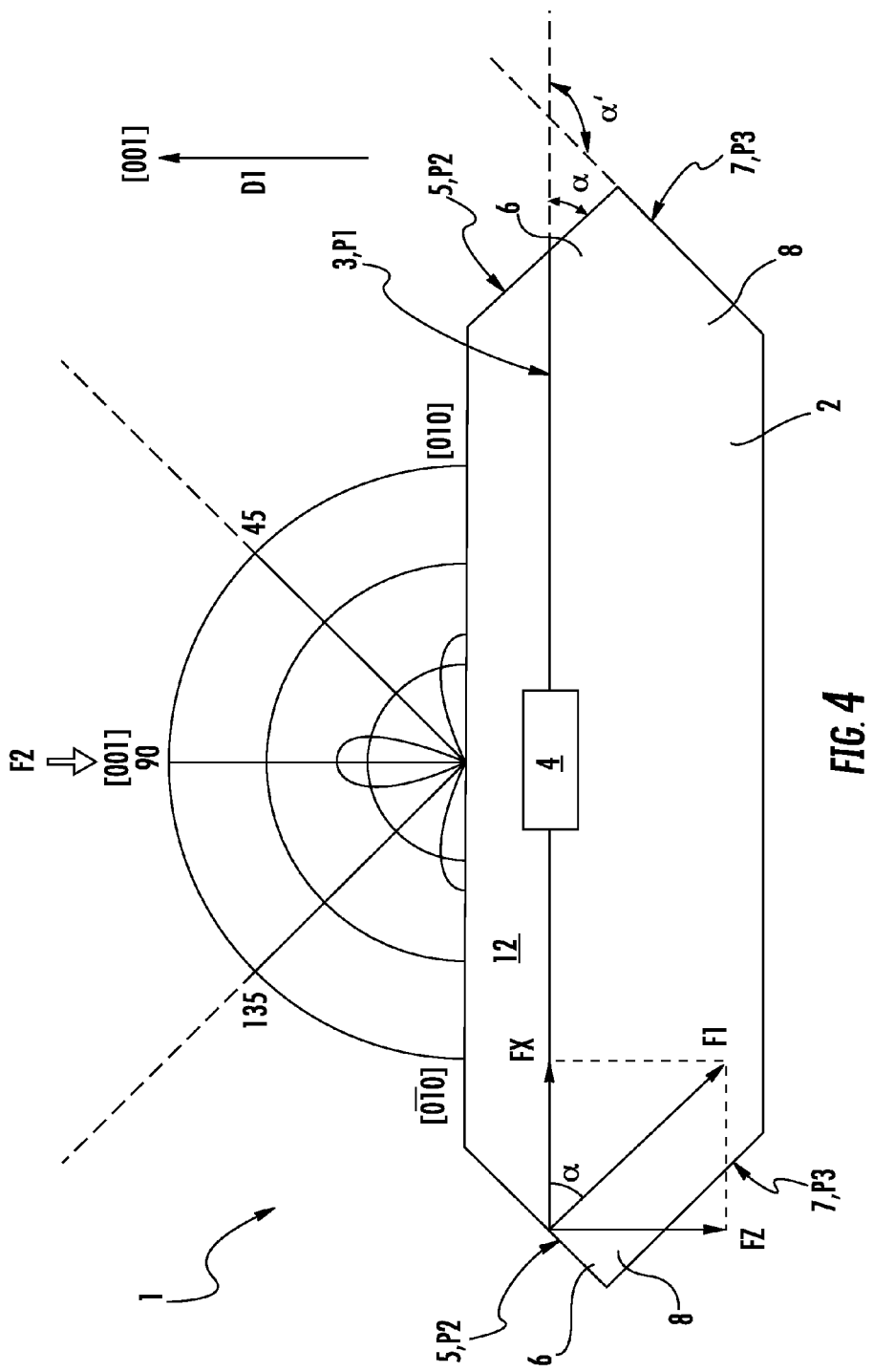

In fact, as illustrated in the FIGS. 2, 3, and 4, a force lateral to the device 1, i.e. having a parallel direction to the plane P1 perpendicular to the predetermined direction D1, which plane is defined by the substantially planar region 3, at the at least one face 5, is embodied by a force F1 acting in a direction other than the predetermined direction D1, i.e. in a direction perpendicular to the plane P2 being defined by said at least one face 5. Accordingly, through the provision of the at least one face 5, a force lateral to the device 1, such as the force F1, has a main direction which is not parallel to the plane P1 being defined by the substantially planar region 3. Thereby, it is not directed to the at least one sensor 4. In addition, the tilting of the plane P2 being defined by the at least one face 5 relative to the plane P1 being defined by the substantially planar region 3 of the substrate 2 advantageously allows to split the force F1 into first component FX and second component FZ.

The first component FX has a direction parallel to the plane P1 being defined by the substantially planar region 3 of the substrate 2. The second component FZ has, on the other hand, a direction parallel to the predetermined direction D1. However, the second component FZ is not directed to the at least one sensor 4 whereas the first component FX, despite being directed to the at least one sensor 4, has a lower value than the value of the force F1 that is experienced on the at least one face 5. In other words, the effect of the force F1 acting in directions other than the predetermined direction D1 is considerably reduced and the perception that the at least one sensor 4 can have thereof is reduced and can be even be neglected.

This is also due to the behavior of the piezo-resistive effect based on what has been described above with reference to FIGS. 1A and 1B when the angles θ and φ are changed. With particular reference to the embodiment in FIG. 4, there results that a=0.

With reference to different embodiments of the invention, the dependence of the reduction in the effect of the force F1 on the predetermined tilting angle γ of the plane P2, which plane is defined by at least one face 5, relative to the plane P1 being defined by the substantially planar region 3 of the substrate 2, perpendicular to the predetermined direction D1, will be described herein below. With reference to the embodiment in FIG. 4, the predetermined tilting angle γ of the plane P2 defined by the at least one face 5 relative to the plane P1 defined by the substantially planar region 3 of substrate 2 being known, it can be easily demonstrated that the tilting angle α of the force F1 relative to the plane P1 being defined by the substantially planar region 3 of the substrate 1 is α=90°−γ, the angle α being thereby complementary to the angle γ.

If the angle α=36° (γ=54°), the lateral stress to which the at least one sensor 4 is subjected, which is arranged at the substantially planar region 3 of substrate 2 is reduced by a cos(α)=0.809 factor. A 20% reduction is thereby obtained. If the angle α=45° (γ=45°), the lateral stress to which the at least one sensor 4 is subjected, which is arranged at the substantially planar region 3 of substrate 2 is reduced by a cos(α)= 0.707 factor. A 30% reduction is thereby obtained. It should be noted that in this case it is also obtained that the force F1 acts in a direction in which the silicon crystal is less sensitive to the stresses.

Thereby, as it can be understood from the characteristics described above, the at least one face 5 is configured to reduce the effect of forces F1 acting in directions other than the predetermined direction D1, on which the detection is desired to be carried out, at the portion 6 of the device 1 around the at least one sensor 4.

With further reference to FIGS. 2, 3, and 4, it should be noted that the device 1 is configured to detect the force F2 acting in the direction [001], thereby reducing the effect of the forces F1 acting in directions other than the predetermined direction D1 (the direction of detection, as defined by the crystalline axis [001]). Therefore, if the crystal axis [001] is oriented at the Cartesian axis z (therefore D1 coincides with z), the device 1 will only detect the vertical component of the force (which in this case is F2). If, on the other hand, the crystal axis [001] is orientated along an axis of the horizontal plane (therefore D1 coincides for example with X or Y), the device will only detect the horizontal, i.e., lateral, component of the force, thereby reducing forces acting in directions other than the predetermined direction (which in this case is the horizontal one), among which also the force acting in the vertical direction.

The reduction of the not-desired component occurs due to the geometric configuration of the portion 6 of the device 1 around the at least one sensor 4 due to the definition of the at least one face 5, as defined above. Particularly, this geometric configuration allows the reduction of an applied force such that it is not experienced, or is however experienced in a very reduced manner, by the at least one sensor 4 and the selection of those forces ($F_1$) acting in directions other than the predetermined direction D1 (direction of detection) as the forces to be reduced. In other words, this geometric configuration of the device 1 is such as to shield the sensitivity lobes of the at least one sensor 4 in the directions orthogonal to the direction of detection.

Figure 5:
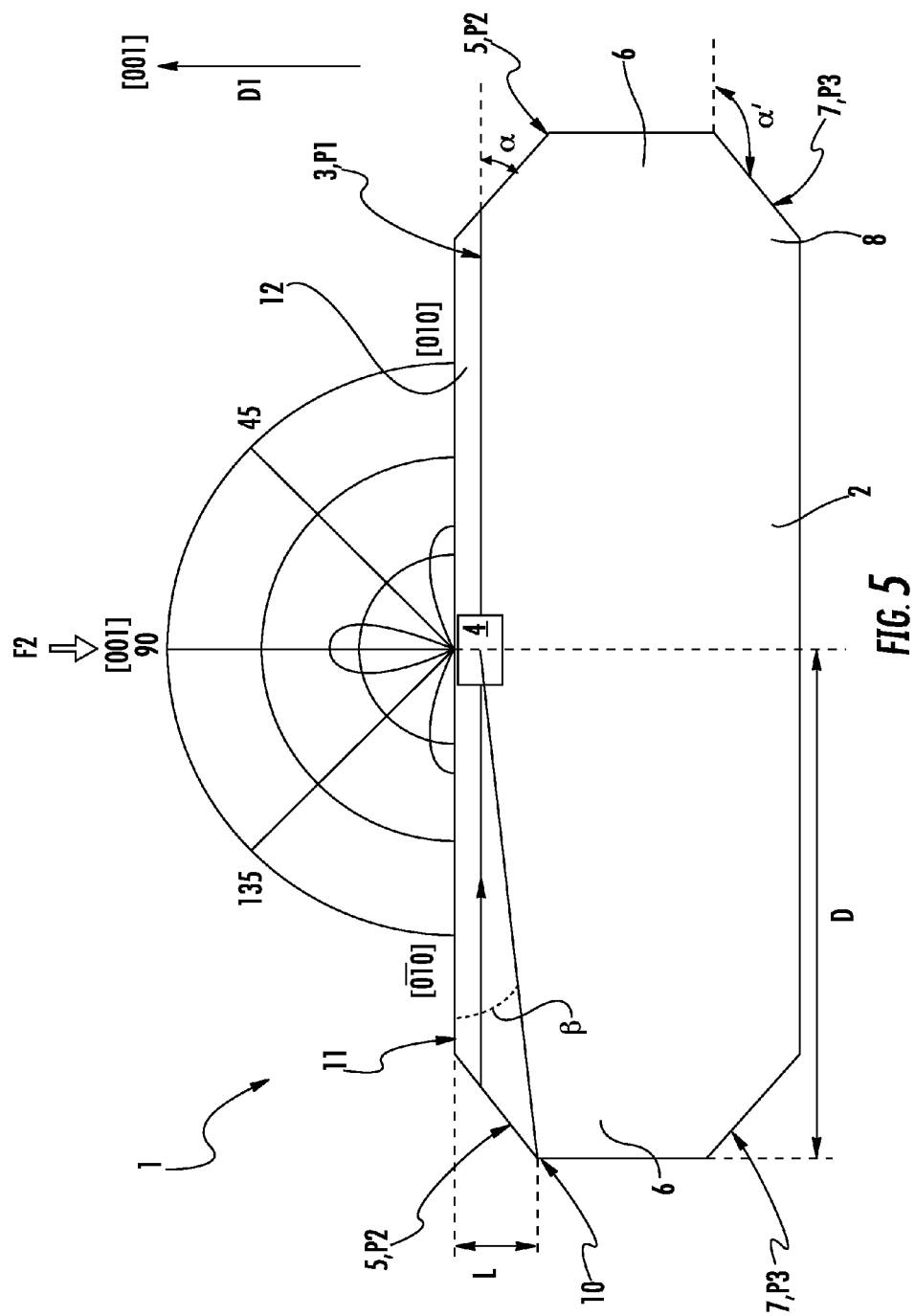
Figure 6:
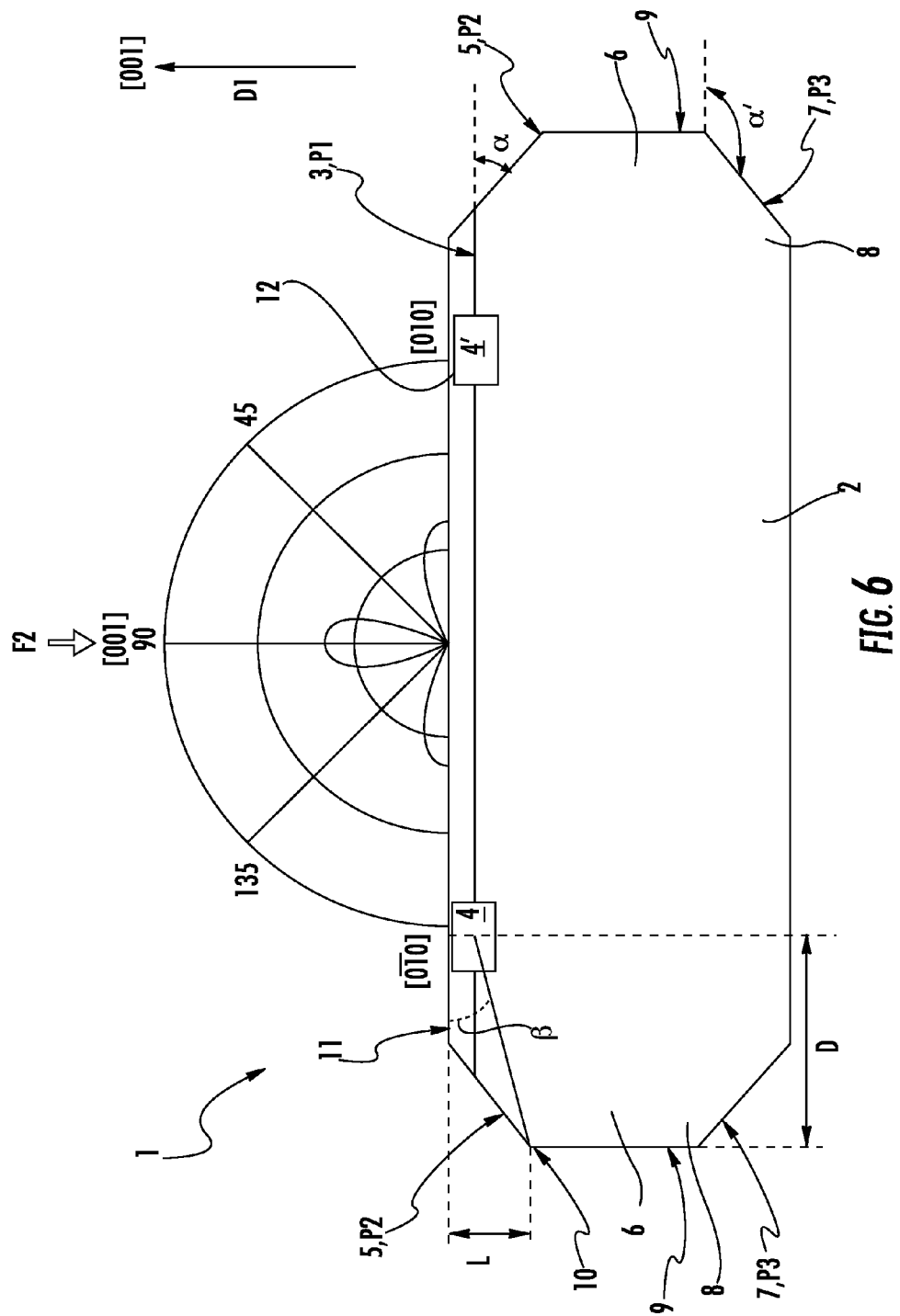

With particular reference to the embodiment in FIGS. 4, 5, and 6 it is provided that the at least one substantially planar face 5 arranged within a portion 6 of the device 1 around the at least one sensor 4 is continuously distributed along a perimeter being defined by the portion 6 of the device 1. It should be observed that only two sides of the at least one face 5 can be seen in the figures (sectional views of the device 1), which sides are arranged on the right and on the left of the at least one sensor 4, respectively.

In accordance with a further embodiment, not illustrated in the figures, the device 1 can comprise a plurality of faces, entirely similar to the at least one face 5, each extending along a side of a perimeter being defined by the portion 6 of the device 1 around the at least one sensor 4. The plurality of faces comprises faces that are separated from each other, i.e. without a junction at the angles of the perimeter being defined by the portion 6 of the device 1.

With further reference to the embodiments illustrated herein (FIGS. 4, 5 and 6), the device 1 comprises at least a further substantially planar face 7, which is arranged in a further portion 8 of the integrated electronic device 1 around the at least one sensor 4, opposite to the portion 6 defined above. This at least one further face 7 pertains to a plane P3 tilted by a further predetermined angle γ' relative to the plane P1 perpendicular to said predetermined direction D1, which plane is defined by the substantially planar region 3 of the substrate 2. In the embodiments in FIGS. 4, 5, and 6, the further predetermined angle γ' is supplementary to the predetermined angle γ (γ'=180°−γ). In accordance with other embodiments, the further predetermined angle γ' can also be non-supplementary to the predetermined tilting angle γ.

The further predetermined angle γ' is defined such as to reduce the effect of forces F1 acting in directions other than the predetermined direction D1 at the further portion 8 of the device 1. The presence of the at least one further face 7 advantageously increases the effect of reducing the forces acting in directions other than the predetermined direction D1 (the direction of detection of the at least one sensor 4), which effect is already ensured by the presence of the at least one face 5.

As stated above for the at least one face 5, the at least one further substantially planar face 7 arranged in the further portion 8 of the device 1 can be continuously distributed along a perimeter defined by the portion 8 of the device 1. It should be observed that only two sides of the at least one further face 7 can be seen in the figures (sectional views of the device 1), which sides are arranged on the right and on the left, respectively.

In accordance with a further embodiment, not illustrated in the figures, the device 1 can comprise a further plurality of faces, entirely similar to the at least one further face 7, each extending along a side of a perimeter being defined by the further portion 8 of the device 1. The plurality of faces comprises faces that are separated from each other, i.e. without a junction at the angles of the perimeter being defined by the further portion 8 of the device 1.

With particular reference to the embodiment in FIG. 4, it should be noted that the at least one face 5 and the at least one further face 7 are, along a sectional plane of the device 1, joined with each other at one point. In other words, the device 1 has, as a whole, a hexagonal profile section.

On the other hand, with particular reference to the embodiments in FIGS. 5 and 6, it should be noted that the at least one face 5 and the at least one further face 7 are, along a sectional plane of the device 1, joined with each other via a junction plane 9. In other words, the device 1 has, as a whole, an octagonal profile section.

In accordance with further embodiments (not illustrated), the device 1 can comprise further faces being arranged in further portions of the device 1 around the at least one sensor 4, further portions arranged between the portion 6 and the further portion 8, as defined above. The faces adjacent to each other can be joined at a point or via a junction plane. In these embodiments, the device 1 will, as a whole, have a section with profile side (e.g. sawtooth-shaped) portions, or any other combination of faces that are sawtooth-joined or joined via junction planes.

It should be understood that, upon manufacturing, the at least one face 5 and the at least one further face 7 (and all the other faces with which the device 1 can be provided), according to the varying embodiments described above, can be obtained using different methods for the directional etching of the substrate 2, e.g. with chemical etching or laser cutting, which are used either individually or in combination with saw cutting. These etching methods are known per se to those skilled in the art.

Referring back to the embodiments in FIGS. 4, 5, 6, and 7, it should be observed that the position of the at least one sensor 4 at the substantially planar region 3, relative to the portion 6 (or further portion 8) of the device 1 affects the sensibility (sensitivity) of the at least one sensor 4 to the lateral stresses, i.e. those forces acting in directions other than the predetermined direction D1 (the direction of detection).

In greater detail, with further reference to FIG. 1A, it should be noted that a strong reduction in the piezo-resistive effect is obtained for an angle equal to about 20°-25°, which is designated with reference β in the figure. Accordingly, if the size of the integrated electronic device 1, at least one sensor 4, desired reduction angle β for the piezo-resistive effect, direction of the lateral force are known, the position of the at least one sensor 4 relative to the portion 6 (further portion 8) of the device 1 can be obtained.

Particularly, with reference to the embodiment in FIG. 5, if it is assumed that the at least one sensor 4 is positioned at a distance D, along the substantially planar region 3 of the device 1, relative to an outer (peripheral) edge 10 of the at least one substantially planar face 5, the following approximate relationship is easily obtained by trigonometric calculations:

$$L = d \tan(\beta)$$

wherein "tan" indicates the tangent function, β (the angle at which the sensitivity is reduced to the desired value), for example ranging between 20° and 25°, and L is the distance, in the predetermined direction D1, between the outermost edge 10 and the innermost edge 11 of the at least one face 5.

In other words, the at least one face 5 has, in the predetermined direction D1, a distance equal to L between the respective edges. The distance L and the distance D of the at least one sensor 4 from the outermost edge 10 of the at least one face 5 are defined such as the lines joining the edges of the at least one face 5 with the at least one sensor 4 form an angle at least equal to the angle of minimum sensitivity β of the at least one sensor 4 or at least equal to an angle β such as to reduce the sensitivity to the desired value.

In accordance with the embodiment in FIG. 6, the device 1 can comprise a further sensor, designated with the numeral 4', which is entirely similar to the at least one sensor 4 described above. In a further embodiment, the at least one sensor 4 and the further sensor 4' can be the parts in which a sensor entirely similar to the at least one sensor 4 can be broken up. Referring back to FIG. 6, the at least one sensor 4 and the further sensor 4' are arranged, relative to the substantially planar region 3, substantially at the same distance from the center of the device 1, each proximate to a peripheral edge of the device 1.

The possibility of placing the at least one sensor 4 obviously allows the fact of being able to increase the angle β defined above, by further reducing the sensitivity of the at least one sensor 4 (and further sensor 4') to the effect of forces acting in directions other than the predetermined direction D1, the direction of detection. Furthermore, the distribution of several sensors in the device 1, however, allows the accurate detection of those forces acting in the predetermined direction D1 substantially throughout the substantially planar region 3 of the substrate 2.

Figure 7:
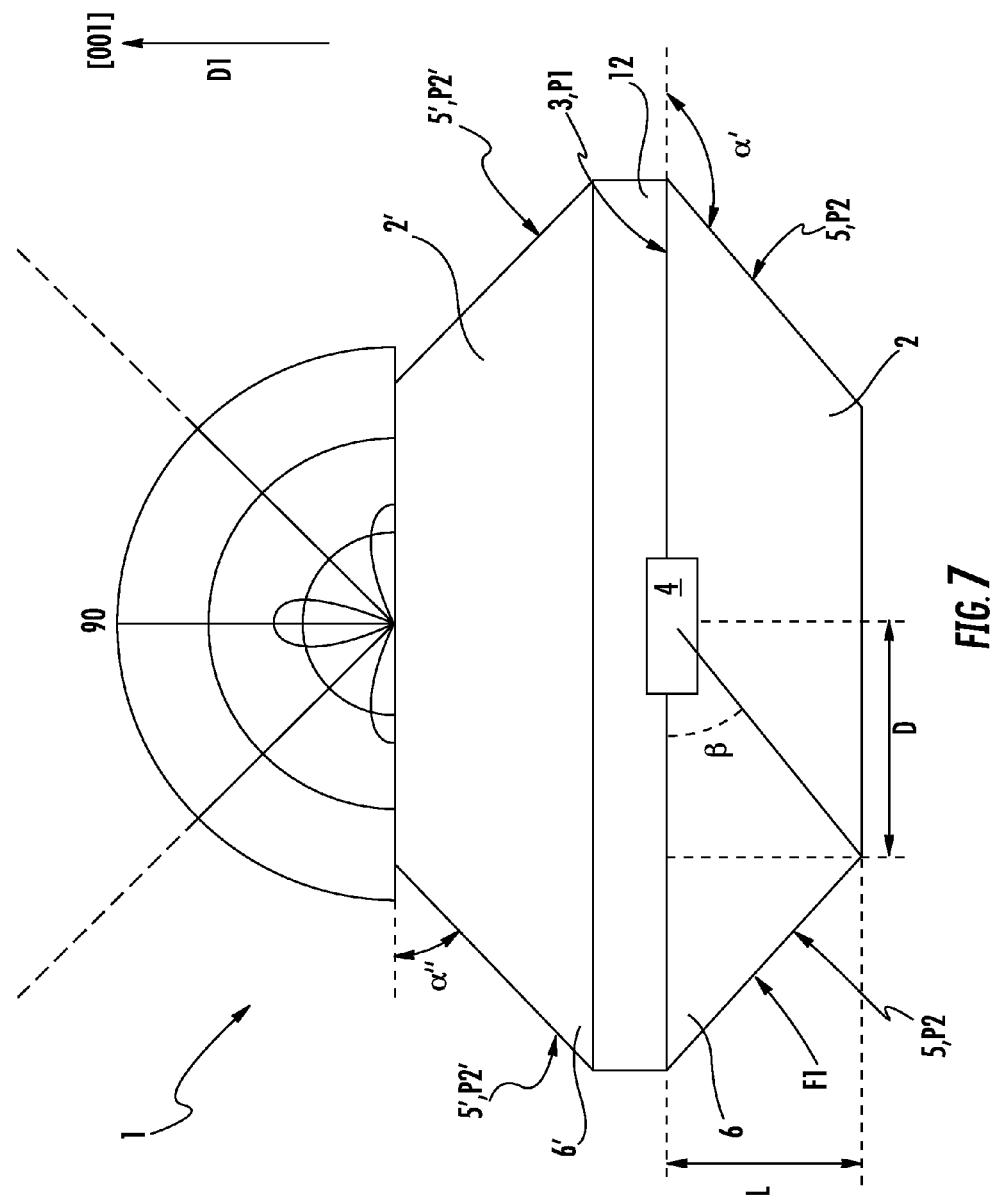

With reference to the embodiment shown in FIG. 7, the device 1 comprises a substrate 2 made of semiconductor material having a substantially planar region 3 that is suitable to define a plane P1 substantially perpendicular to said predetermined direction.

Furthermore, the device 1 comprises at least one sensor 4, entirely similar to the one described above with reference to other embodiments, which is configured to detect said local parameter at least in said predetermined direction D1 with a piezo-resistive effect. The at least one sensor 4 is arranged at the substantially planar region 3 of the substrate 2. The device 1 comprises at least one substantially planar face 5 which is arranged in a portion 6 of device 1 around the at least one sensor 4.

This at least one face 5 pertains to a plane P2 tilted by a predetermined angle γ' relative to the plane P1 perpendicular to said predetermined direction D1, which plane is defined by the substantially planar region 3 of the substrate 2. The predetermined angle γ' is defined such as to reduce on the at least one sensor 4 the effect of forces F1 acting in directions other than the predetermined direction D1 at the portion 6 of the device 1 around the at least one sensor 4.

In greater detail, the portion 6 of the device 1 is preferably in the substrate 2. The device 1 further comprises a functional circuitry 12, a portion thereof representing the at least one sensor 4. The functional circuitry 12 is arranged within the substrate 2 starting from the substantially planar region 3. It should be noted that this planar circuitry will be described below, in greater detail, with general reference to the various embodiments of the device 1 that have been described above.

With further reference to the embodiment in FIG. 7, the device 1 further comprises a further substrate 2' of a semiconductor material, which is arranged on the functional circuitry 12. The further substrate 2' can be of the same semiconductor material (e.g., silicon) as the substrate 2, or can, in other embodiments, be of a semiconductor material having similar mechanical characteristics. Furthermore, in further embodiments, the semiconductor material of the substrate 2 and of the further substrate 2' can have different electric resistivity, particularly the semiconductor material of the further substrate 2' can have a high electric resistivity (e.g., higher than 10 Ωcm) to reduce the phenomenon of the parasitic eddy currents which are due to the presence of, in the functional circuitry 12, an integrated antenna, which will be described below.

The device 1 further comprises at least one substantially planar further face 5' which is arranged in a portion 6' of device 1 around the at least one sensor 4. It should be understood that this portion 6' of the device 1 is preferably within the further substrate 2'. The at least one further face 5' pertains to a plane P2' tilted by a predetermined angle γ'' relative to the plane P1 perpendicular to the predetermined direction D1, which plane is defined by the substantially planar region 3 of the substrate 2.

This predetermined angle γ'' is defined such as to reduce on the at least one sensor 4 the effect of forces F1 acting in directions other than the predetermined direction D1 at the portion 6' of the further substrate 2 of the device 1 around the at least one sensor 4.

Figure 8:
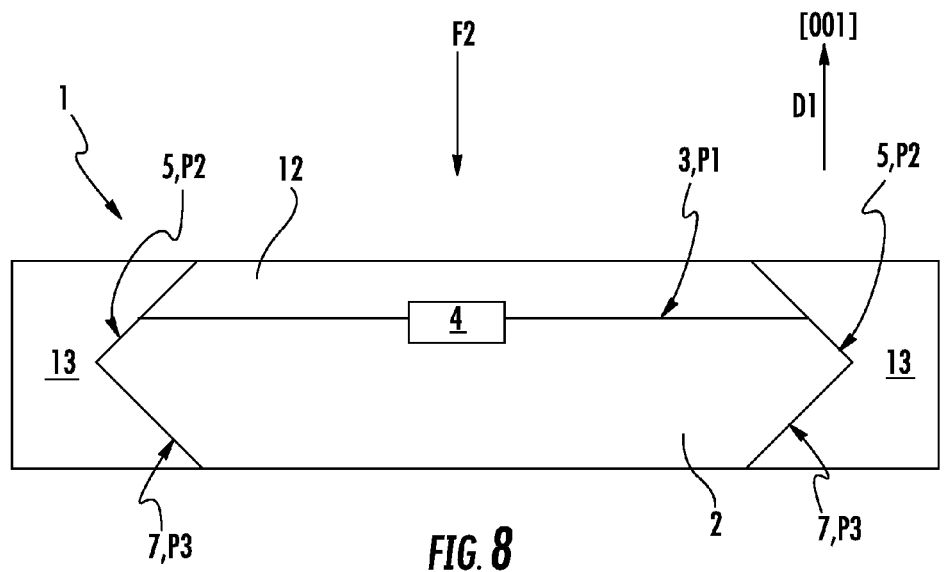
Figure 9:
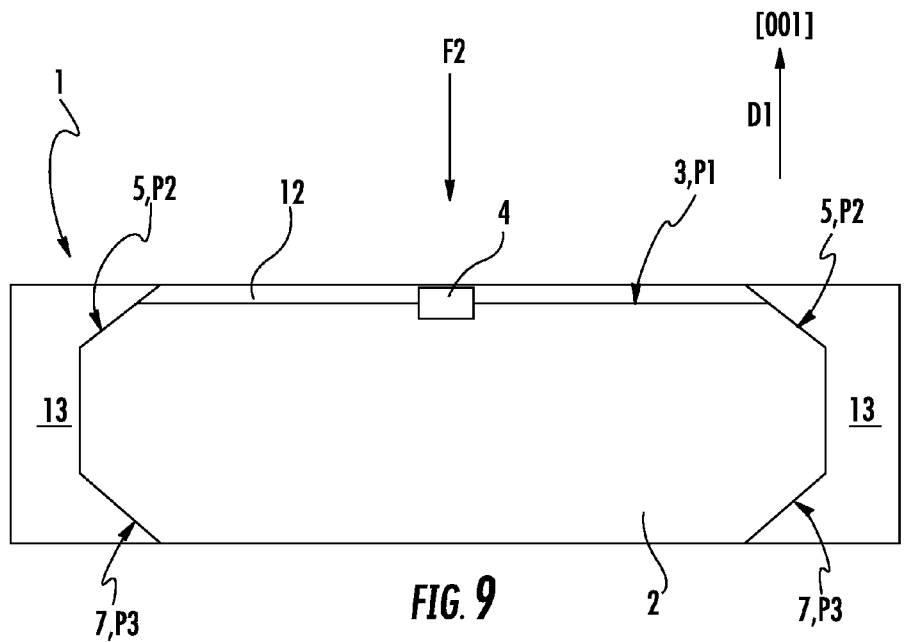

The at least one face provided on the further substrate 2' further reduces the sensitivity of the at least one sensor 4 to the effect of forces acting in directions other than the predetermined direction D1, i.e., the direction of detection. It should be understood that the substrate 2 and the further substrate 2' can be also attached to each other, e.g. using glues or resins, also according to what has been described below with reference to the embodiments in FIGS. 8 and 9.

Furthermore, it should be understood that in accordance to further embodiments, not illustrated, the device 1 can comprise only the at least one face 5 or only the at least one further face 5'. The only at least one face 5 or the only at least one further face 5' can represent the entire side surface of the device 1, and thus only the portion 6 of the substrate 2 or only the portion 6' of the further substrate 2' can be provided.

It should be also understood that the at least one further face 5' can be distributed to the further portion 6' on the further substrate 2' according to varying embodiments that have been already described above with reference to the possible distribution of the at least one face 5 on the portion 6 of the substrate 2.

Referring back, in general, to the embodiments described above, the device 1 further comprises a functional circuitry, a portion thereof representing the at least one sensor 4. The functional circuitry 12 is arranged in the substrate 2 from the substantially planar region 3, and is provided with connecting lines that are comprised in the dielectric or insulating material, which consist of different levels of metallization connected by conductive paths, using microelectronic techniques known per se.

To the purposes of the present description, by "integrated functional circuitry" is meant the portion of the integrated electronic detecting device 1 which is suitable to implement the functional blocks comprised in the device, such as those illustrated in the functional diagram illustrated in FIG. 10, which will be described below.

In accordance with further embodiments (FIGS. 8 and 9), the device 1 further comprises at least one damping element 13 which is arranged to cover the substrate 2 and integrated functional circuitry 12. The at least one damping element 13, made from flexible or elastic material is configured to damp forces (e.g. designated with F1) acting in directions substantially perpendicular to the predetermined direction D1 of which the detection is desired to be carried out. The property of this material is absorbing, or damping, or attenuating the forces acting thereon, from which the general definition of "elastic" or "flexible/elastic" material is derived.

Particularly, this material should be more elastic than the construction material (for example reinforced concrete or stone) of the structure to be monitored, and, advantageously, also more elastic than the semiconductor (for example, silicon) which the at least one sensor 4 and the substrate 2 of the device 1 are made from. Thereby, this material (and the damping element of which it is made) can withstand long-term strains of the solid structure to be monitored.

Examples of a flexible or elastic material suitable for the damping function are: polyesters, PVC, silicone, Teflon, Kapton, Polyimide, PEN, PET, epoxy resins, elastomers, rubber.

Accordingly, the at least one damping element 13 contributes to, along with the at least one face 5, as defined above, reduce if not eliminate the forces acting in directions other than the predetermined direction D1 (direction of detection of the at least one sensor 4). It should be understood that the damping element 13 is also applicable to the embodiment in FIG. 7.

Figure 10:
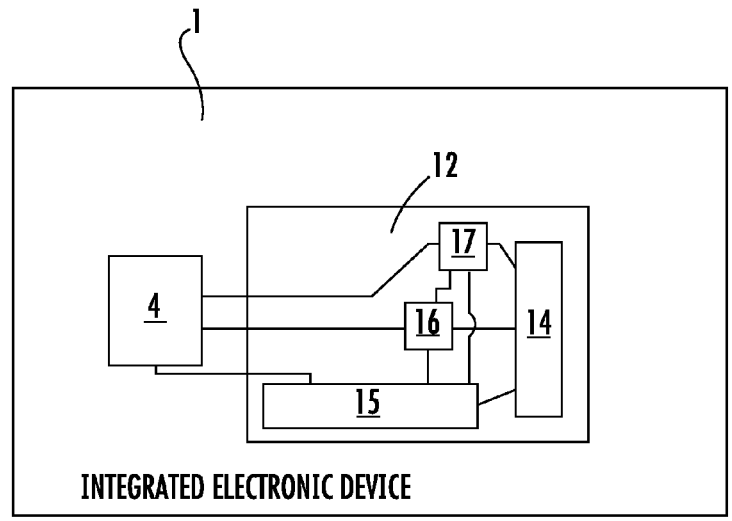
FIG. 10 is a schematic block diagram illustrating an integrated electronic device according to an embodiment of the invention.

With reference now to FIG. 10, the integrated electronic device 1 will be now described from a functional point of view, according to an embodiment of the invention. As also stated above, the device 1 comprises an integrated functional circuitry 12. The integrated functional circuitry 12 comprises the at least one sensor 4 described above. The integrated functional circuitry 12 further comprises an integrated antenna 14.

The integrated antenna 14 has the function of transmitting outside the device 1, in wireless mode, the data being measured, i.e., the intensity of each of the electrical variables, both dependent and representative, respectively, of one among the physical quantities (force and/or pressure and/or mechanical stress) to be detected and monitored. The integrated antenna 14 has further the function of receiving operating commands from the outside.

Furthermore, the integrated antenna 14 can have the further function of receiving radiofrequency waves which are required for a remote supply (i.e., a "contactless power supply") to the integrated electronic device 1, without requiring batteries or a power supply in loco.

The integrated functional circuitry 12 comprises, as auxiliary blocks, a supply circuit 15, a driving circuit 16 and a control circuit 17. The supply circuit 15 is suitable to get the power supply required for the operation of the detecting device 1 from radiofrequency waves received from the integrated antenna 14. The driving circuit 16 is suitable to drive the integrated antenna 14 so that it transmits the data being measured in wireless mode.

The control circuit 17 is suitable to control the operation of the integrated functional circuitry 12 of the device 1, according to what is commanded by operating commands that are sent from the outside and received by the integrated antenna 14. The supply circuit 15, the driving circuit 16 and the control circuit 17 can be made using circuits known per se, in "Smart Card" manufacturing technologies or RFID (Radio Frequency Identification) technology.

In accordance with an embodiment, the detecting device 1 further comprises a passivation layer (not shown in the figures), i.e. an impermeable and protective layer, which is suitable to entirely cover the integrated functional circuitry 12, therefore said at least one sensor 4, or preferably the whole chip with which the device 1 is manufactured, such that the device 1, as a whole, is completely sealed and galvanically insulated from the surrounding environment.

According to embodiments, the passivation layer can be made of silicon oxide, or silicon nitride, or silicon carbide. In a particular embodiment, the passivation layer, or better the device 1, is surrounded by construction material, having suitable properties of micro-granularity and homogeneity, and compatible with the material forming the structure to be monitored.

Figure 11:
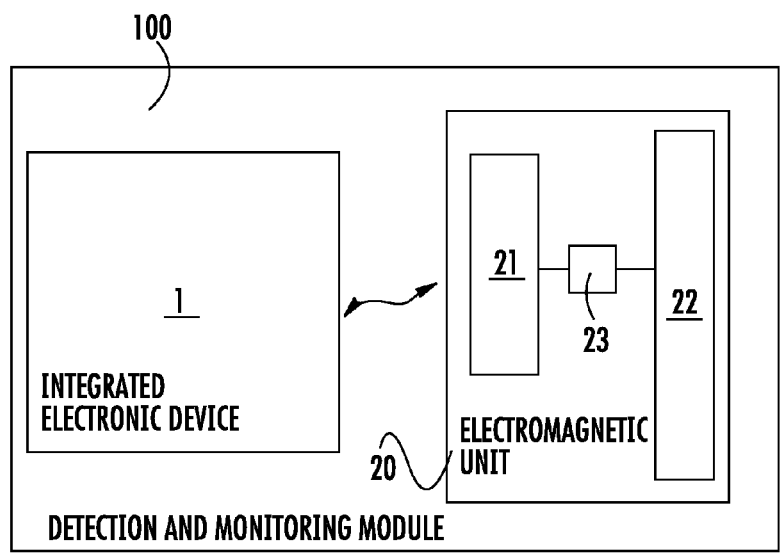
FIG. 11 is a schematic block diagram illustrating a detection and monitoring module including the integrated electronic device according to an embodiment of the invention.

With reference to FIG. 11, a detection and monitoring module 100, also simply defined below as module, according to an embodiment of the invention, will be now described. The module 100 comprises an integrated electronic detecting device 1, according to any of the embodiments described above, and further comprises an electromagnetic unit or means 20 for the transmission/reception of signals for telecommunications and energy exchange between the integrated antenna 14 of the device 1 and a remote antenna 221. The electromagnetic means 20 are integral with the device 1. The integrated antenna 14, the electromagnetic means 20 and the remote antenna 221 are operatively connected by magnetic or electromagnetic coupling in wireless mode.

The electromagnetic means 20 fulfill the requirement of allowing a communication between the device 1 and an external system of control and data collection, which is remotely located, for example at a distance of a few centimeters or meters from the structure to be monitored and thus from the device 1. This implies the requirement of transmitting electromagnetic energy either in the far or near fields, also in view of the attenuations due to the solid structure, that the electromagnetic fields must pass through.

To the purpose, the electromagnetic means 20 have a function of electromagnetic expansion and focalization, i.e., of both focusing an external electromagnetic field, and the energy thereof, to the integrated antenna 14 of the detecting device 1, and, similarly, of expanding an electromagnetic field emitted from the integrated antenna 14, and the energy thereof, to a remote antenna.

Particularly, the electromagnetic means 20 comprise at least two antennas, a first antenna 21 and a second antenna 22, which are connected to each other by connection 23. The connection 23 can be for example a simple transmission line or other circuit. The first antenna 21 communicates with the integrated antenna 14 of the integrated detection module 100, with electromagnetic fields, and preferably by coupling the magnetic field (i.e., magnetic coupling in the near field). The second antenna 22 communicates with a remote antenna 221, for example of the external system of control and data collection, with coupling of electromagnetic fields (i.e., electromagnetic coupling in the far field). It should be noted that both the first antenna 21 and the second antenna 22 can be a magnetic dipole or a Hertzian dipole or also another type of known antenna, as long as it is capable of providing the functions described above.

Figure 12:
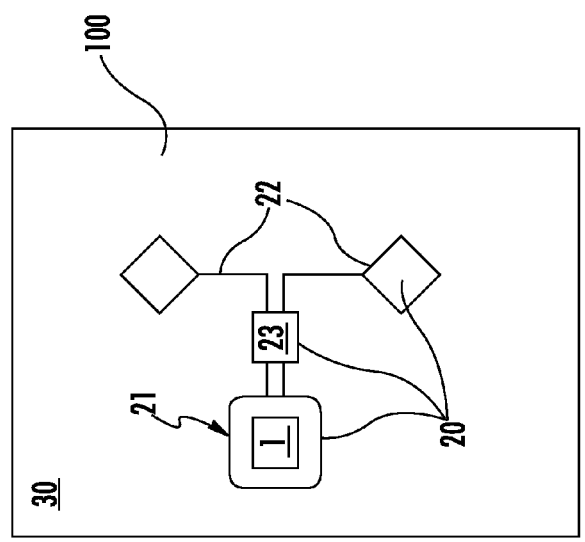
FIG. 12 is a schematic block diagram illustrating the detecting and monitoring module of FIG. 11, from a structural point of view.

With reference now to FIG. 12, the detecting and monitoring module 100 will be now described from a structural point of view, in accordance with the embodiment in FIG. 11. In greater detail, the first antenna 21 of the electromagnetic means 20 comprises a coil 21. The connecting means 23 of the electromagnetic means 20 comprise an adapting circuit 23, which is known per se. The second antenna 22 of the electromagnetic means 2 comprises a Hertzian dipole antenna 22.

The coil 21 is positioned near the device 1 and develops thereabout, in such a way as to magnetically couple with the integrated antenna 11. The currents induced by the integrated antenna 11 on the coil 21, which acts as the magnetic dipole, are transferred to the Hertzian dipole antenna 22. This transfer is preferably mediated by the adapting circuit 23, which allows improving the overall performance of the electromagnetic means 20.

The module 100 further comprises a support 30, for example of a polymeric material, on which the device 1 and the electromagnetic means 2 are positioned, such as by gluing. The support 30 has the main functions of keeping the module 100 and the electromagnetic means 20 integral to each other, and further of keeping the module 100 in a predetermined position within the structure to be monitored, as will be illustrated below.

Figure 13:
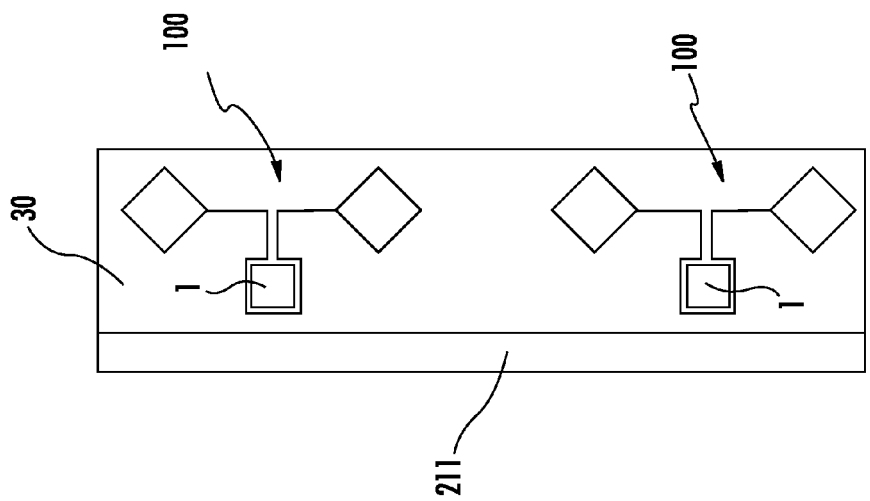
FIG. 13 is a schematic block diagram illustrating a detecting and monitoring module according to a further embodiment of the invention, from a structural point of view.

According to a variant embodiment, illustrated in FIG. 13, a support strip of polymeric material is provided, still designated with the numeral 30, such as to be fixed to a support structure 211, and suitable to accommodate, at predetermined distances and positions, a plurality of modules 100, which are entirely similar to the module 100 described above.

With reference to FIG. 13, it should be noted that both modules 100 comprise a respective detecting device 1, each of which comprises a respective sensor, wherein one of the two sensors is configured for detecting the component of the force acting in the predetermined direction D1 and the other of the two sensors is configured for detecting the component of the force acting in a plane perpendicular to the predetermined direction D1 or however acting in a direction other than the predetermined direction D1.

Figure 14:
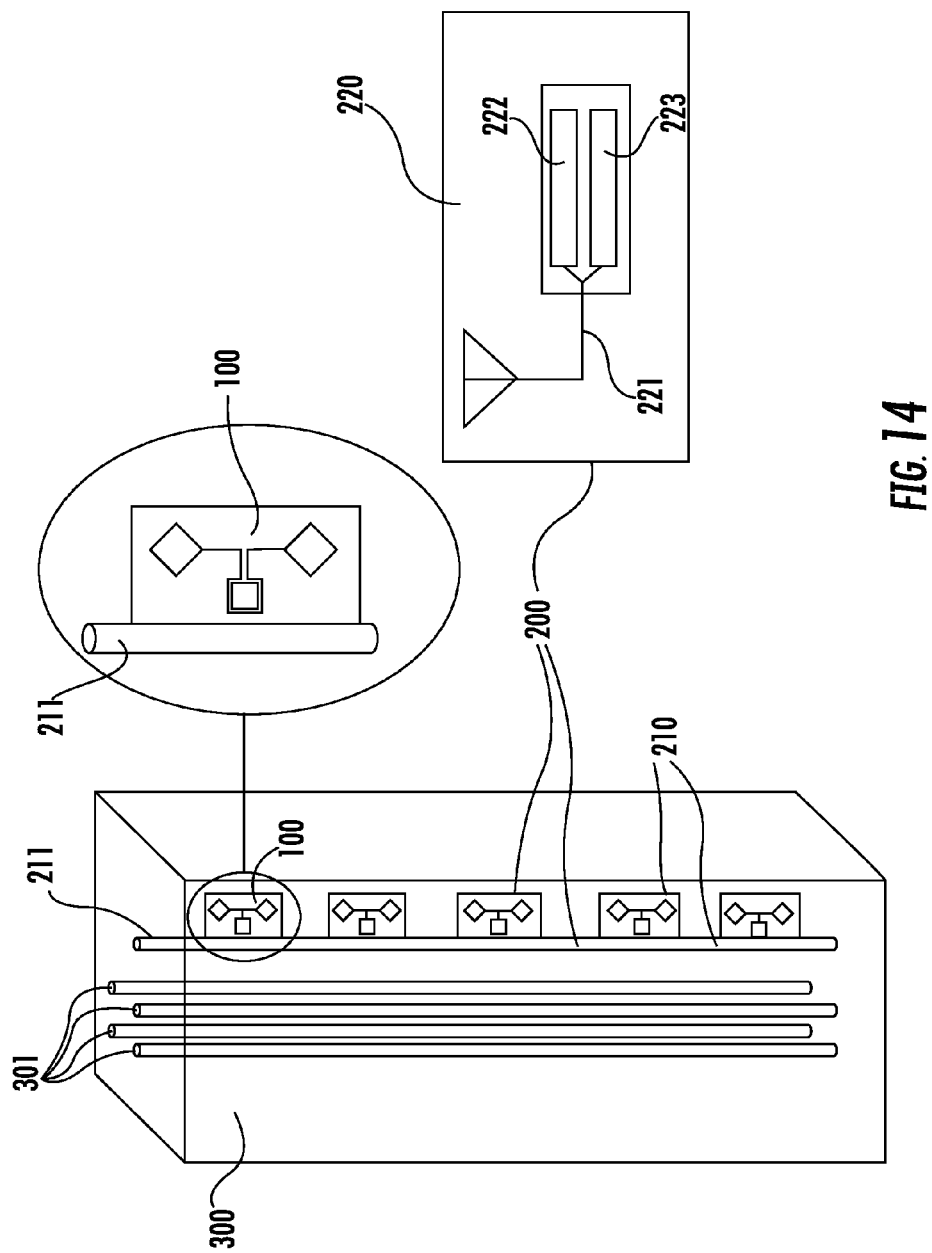
FIG. 14 is a schematic block diagram illustrating a monitoring system according to an embodiment of the invention.

With reference to FIG. 14, a monitoring system 200 of one or more parameters in a plurality of points within a solid structure 300 is described. The system 200 comprises an internal monitoring sub-system 210 placed within the solid structure 300. The system 200 further comprises an external sub-system of control and data collection 220 placed outside of and remote from the solid structure 300.

The internal monitoring sub-system 210 comprises a support structure 211 passing through the points to be monitored within the solid structure 300, and further comprises a plurality of monitoring modules 100, according to one of the embodiments described above. Each of this plurality of monitoring modules 100 is attached to the support structure 211 in a known and predefined position.

The external sub-system of control and data collection 220 comprises an external antenna 221, capable of communicating electromagnetically with the electromagnetic means 20 of the monitoring modules 100; it further comprises means for collecting, storing and processing data 222, suitable to receive, store and process data from a plurality of monitoring modules 100 representative of parameters to be monitored; and finally it comprises supply and contactless power supply means 223, suitable to provide supply power to the external sub-system of control and data collection 220 and contactless power supply energy to the internal monitoring sub-system 210, by means of the external antenna 221.

In the example of FIG. 14, the structure to be monitored is a reinforced concrete pillar 300, comprising steel reinforcement rods 301, which can also be used as a support structure 211.

As may be noted, the object of the present invention is fully achieved in that the detection device of the present invention allows for the accurate detection of each individual component of the force and/or pressure and/or mechanical stress that is present in a point to be monitored within a solid structure.

By orientating the sensor so as to align the axis of piezoresistive sensitivity to the predetermined direction in which the force is desired to be detected, an accurate result is obtained, which exactly measures the desired component, while the effects of the components acting on a plane perpendicular to this predetermined direction result to be substantially reduced and possibly zeroed (due to the geometrical configuration of the device, particularly the provision of at least one substantially planar face arranged as described above). The predetermined direction can be any, particularly a vertical direction and any (also horizontal) direction other than the vertical one.

Furthermore, both with the device and the module, several, differently orientated, sensors can be provided, so as to detect all the varying components of the force, but, advantageously, separately from one another. In addition, the crystalline axes can be rotated and the varying structures and embodiments can be adapted according to this rotation of the axes.

To the embodiments of the detecting device, and of the module and of the monitoring system described above, those skilled in the art, to meet contingent requirements, may carry out modifications, adaptations, and replacements of elements with others functionally equivalent also in conjunction with the prior art, also by creating hybrid implementations, without departing from the scope of the following claims. Each of the characteristics described as belonging to a possible embodiment can be carried out independently from the other embodiments described herein.

That which is claimed:

1. An integrated electronic device for detecting a local parameter related to a force experienced in a given direction, within a solid structure, the device comprising:
   a substrate comprising a semiconductor material having a substantially planar region configured to define a plane substantially perpendicular to the given direction;
   at least one sensor, arranged at the substantially planar region of the substrate, and configured to detect the local parameter at least in the given direction with a piezoresistive effect;
   at least one substantially planar face configured in a portion of the integrated electronic device around the at least one sensor, the at least one face belonging to an inclined plane by an angle relative to the plane substantially perpendicular to the given direction, which plane is defined by the substantially planar region of the substrate;

the angle being defined such as to reduce on the at least one sensor the effect of forces acting in directions other than the given direction at the portion of the device around the at least one sensor.

2. The integrated electronic device according to claim 1, wherein the at least one substantially planar face is continuously distributed along a perimeter defined by the portion of the device around the at least one sensor.

3. The integrated electronic device according to claim 1, further comprising a plurality of faces, separated from each other, and each extending along a side of a perimeter defined by the portion of the device around the at least one sensor.

4. The integrated electronic device according to claim 1, further comprising at least one additional substantially planar face arranged in an additional portion of the integrated electronic device around the at least one sensor, which is opposite to the portion, said at least one additional face belonging to a inclined plane of an additional angle relative to the plane perpendicular to the given direction which plane is defined by the substantially planar region of the substrate, the additional angle being defined such as to reduce forces acting in directions other than the given direction at the additional portion of the device.

5. The integrated electronic device according to claim 4, wherein the at least one additional substantially planar face arranged in the additional portion of the device is continuously distributed along a perimeter defined by the portion of the device.

6. The integrated electronic device according to claim 4, further comprising a plurality of additional faces, separated from each other, and each extending along a side of a perimeter defined by the additional portion of the device.

7. The integrated electronic device according to claim 4, wherein the at least one face and the at least one additional face, along a sectional plane of the device, are joined to each other at a point.

8. The integrated electronic device according to claim 4, wherein the at least one face and the at least one additional face, along a sectional plane of the device, are joined to each other via a junction plane.

9. The integrated electronic device according to claim 1, wherein the at least one sensor further comprises an additional sensor configured to detect the local parameter at least in the given direction with a piezo-resistive effect, the at least one additional sensor being arranged at the substantially planar region of the substrate.

10. The integrated electronic device according to claim 9, wherein the at least one sensor and the additional sensor are arranged, relative to the substantially planar region, substantially at the same distance from a center of the device, each proximate to a peripheral edge of the device.

11. The integrated electronic device according to claim 1, further comprising operational circuitry within the substrate, a portion of the operational circuitry defining the at least one sensor.

12. The integrated electronic device according to claim 11, wherein the portion of the device is within the substrate, the device further comprising:
an additional substrate of a semiconductor material arranged on the operational circuitry;
at least one additional substantially planar face arranged in another portion of the device around the at least one sensor, the another portion of the device being in the additional substrate, the at least one additional face belonging to another inclined plane of an angle relative to the plane perpendicular to the given direction which plane is defined by the substantially planar region of the substrate;
the angle being defined such as to reduce on the at least one sensor the effect of forces acting in directions other than the given direction at the another portion of the additional substrate of the device around the at least one sensor.

13. The integrated electronic device according to claim 12, further comprising at least one damping element arranged to cover the substrate and the integrated operational circuitry, the at least one damping element comprising an elastic material and being configured to dampen forces acting in directions substantially perpendicular to the given direction.

14. A detection and monitoring module comprising:
at least one integrated electronic device for detecting a local parameter related to a force experienced in a given direction, within a solid structure, the device comprising
a substrate comprising a semiconductor material having a substantially planar region configured to define a plane substantially perpendicular to the given direction,
a sensor, arranged at the substantially planar region of the substrate, and configured to detect the local parameter at least in the given direction with a piezo-resistive effect,
an integrated antenna coupled to the sensor;
at least one substantially planar face configured in a portion of the integrated electronic device around the sensor, the at least one face belonging to an inclined plane by an angle relative to the plane substantially perpendicular to the given direction, which plane is defined by the substantially planar region of the substrate,
the angle being defined such as to reduce on the sensor the effect of forces acting in directions other than the given direction at the portion of the device around the sensor; and
an integrated electromagnetic unit configured to communicate signals for telecommunications and energy exchange between the integrated antenna of the device and a remote antenna, the electromagnetic unit being integral with the integrated electronic device;
the integrated antenna, the electromagnetic unit and the remote antenna being operatively connected through wireless coupling in a wireless mode.

15. The detection and monitoring module according to claim 14, wherein the at least one integrated electronic device comprises a plurality of integrated electronic detection devices each comprising a respective sensor, wherein at least one sensor is configured to detect the component of the force acting in the given direction and another of the sensors is configured to detect the component of the force acting in a direction other than the given direction.

16. The detection and monitoring module according to claim 14, wherein, in the integrated electronic device, the at least one substantially planar face is continuously distributed along a perimeter defined by the portion of the device around the sensor.

17. The detection and monitoring module according to claim 14, wherein the integrated electronic device further comprises a plurality of faces, separated from each other, and each extending along a side of a perimeter defined by the portion of the device around the sensor.

18. A monitoring system of one or more parameters in a plurality of points within a solid structure, the system comprising:

an internal monitoring sub-system positioned within the solid structure;

an external sub-system of control and data collection positioned outside of and remote from the solid structure;

the internal monitoring sub-system comprising
- a support structure passing through the points to be monitored within the solid structure, and
- a plurality of monitoring modules each being fixed to the support structure in a position, and each comprising
- at least one integrated electronic device for detecting parameters related to a force experienced in a given direction, within the solid structure, the device comprising
  - a substrate comprising a semiconductor material having a substantially planar region configured to define a plane substantially perpendicular to the given direction,
  - a sensor, arranged at the substantially planar region of the substrate, and configured to detect the local parameter at least in the given direction with a piezo-resistive effect,
  - an integrated antenna coupled to the sensor, and
  - at least one substantially planar face configured in a portion of the integrated electronic device around the sensor, the at least one face belonging to an inclined plane by an angle relative to the plane substantially perpendicular to the given direction, which plane is defined by the substantially planar region of the substrate,
  - the angle being defined such as to reduce on the sensor the effect of forces acting in directions other than the given direction at the portion of the device around the sensor, and
  - an integrated electromagnetic unit configured to communicate signals for telecommunications and energy exchange between the integrated antenna of the device and a remote antenna;

the external sub-system of control and data collection comprising
- an external antenna, defining the remote antenna, and configured to electromagnetically communicate with the electromagnetic unit of the monitoring modules,
- a data processor configured to collect, store and process data from the plurality of monitoring modules representative of parameters to be monitored, and
- a power unit configured to provide supply power to the external sub-system of control and data collection and supply contactless power to the internal monitoring sub-system, through the external antenna.

19. The monitoring system according to claim 18, wherein, in the integrated electronic device, the at least one substantially planar face is continuously distributed along a perimeter defined by the portion of the device around the sensor.

20. The monitoring system according to claim 18, wherein the integrated electronic device further comprises a plurality of faces, separated from each other, and each extending along a side of a perimeter defined by the portion of the device around the sensor.

21. A method for detecting a local parameter related to a force experienced in a given direction, using an integrated electronic device within a solid structure, the method comprising:
- providing a substrate comprising a semiconductor material having a substantially planar region configured to define a plane substantially perpendicular to the given direction;
- positioning at least one sensor at the substantially planar region of the substrate, and configured to detect the local parameter at least in the given direction with a piezo-resistive effect;
- configuring at least one substantially planar face in a portion of the integrated electronic device around the at least one sensor, the at least one face belonging to an inclined plane by an angle relative to the plane substantially perpendicular to the given direction, which plane is defined by the substantially planar region of the substrate;
- the angle being defined such as to reduce on the at least one sensor the effect of forces acting in directions other than the given direction at the portion of the device around the at least one sensor.

22. The method according to claim 21, wherein the at least one substantially planar face is continuously distributed along a perimeter defined by the portion of the device around the at least one sensor.

23. The method according to claim 21, further comprising configuring a plurality of faces, separated from each other, and each extending along a side of a perimeter defined by the portion of the device around the at least one sensor.

24. The method according to claim 21, further comprising configuring at least one additional substantially planar face in an additional portion of the integrated electronic device around the at least one sensor, which is opposite to the portion, the at least one additional face belonging to a inclined plane of an additional angle relative to the plane perpendicular to the given direction which plane is defined by the substantially planar region of the substrate, the additional angle being defined such as to reduce forces acting in directions other than the given direction at the additional portion of the device.

25. The method according to claim 21, wherein the at least one sensor further comprises an additional sensor configured to detect the local parameter at least in the given direction with a piezo-resistive effect, the at least one additional sensor being arranged at the substantially planar region of the substrate.

26. The method according to claim 25, wherein the at least one sensor and the additional sensor are arranged, relative to the substantially planar region, substantially at the same distance from a center of the device, each proximate to a peripheral edge of the device.

* * * * *